United States Patent
Nakamura et al.

(10) Patent No.: US 8,954,233 B2
(45) Date of Patent: Feb. 10, 2015

(54) VEHICLE BODY DRIFTING SUPPRESSION DEVICE

(75) Inventors: Yoshifumi Nakamura, Utsunomiya (JP); Norio Yamazaki, Utsunomiya (JP); Shigenori Takimoto, Utsunomiya (JP); Yoshimichi Kawamoto, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 840 days.

(21) Appl. No.: 12/465,453

(22) Filed: May 13, 2009

(65) Prior Publication Data

US 2009/0287377 A1    Nov. 19, 2009

(30) Foreign Application Priority Data

May 16, 2008 (JP) ................. P2008-129693

(51) Int. Cl.
| | |
|---|---|
| *B62D 6/04* | (2006.01) |
| *B62D 6/08* | (2006.01) |
| *B62D 6/06* | (2006.01) |
| *B62D 5/04* | (2006.01) |

(52) U.S. Cl.
CPC .. *B62D 6/04* (2013.01); *B62D 6/08* (2013.01); *B62D 6/06* (2013.01); *B62D 5/0463* (2013.01)
USPC .... 701/41; 280/5.502; 280/5.506; 280/5.507; 280/5.508; 280/5.51; 180/443; 180/444; 180/445; 180/446

(58) Field of Classification Search
CPC .............. B62D 6/04; B62D 6/06; B62D 6/08; B62D 5/0463
USPC ............ 280/5.502, 5.506, 5.507, 5.508, 5.51; 701/41; 180/443, 444, 445, 446
See application file for complete search history.

(56) References Cited

U.S. PATENT DOCUMENTS

| | | | | | |
|---|---|---|---|---|---|
| 5,103,925 | A | * | 4/1992 | Imaseki et al. ................ | 180/415 |
| 5,184,298 | A | * | 2/1993 | Imaseki et al. .................... | 701/41 |
| 5,528,497 | A | * | 6/1996 | Yamamoto et al. ............. | 701/41 |
| 5,717,591 | A | * | 2/1998 | Okada et al. ..................... | 701/82 |
| 5,828,973 | A | * | 10/1998 | Takeuchi et al. ................ | 701/41 |
| 5,845,222 | A | * | 12/1998 | Yamamoto et al. ............. | 701/41 |
| 5,857,160 | A | * | 1/1999 | Dickinson et al. .............. | 701/41 |
| 6,091,214 | A | * | 7/2000 | Yamawaki et al. ............. | 318/52 |
| 6,131,688 | A | * | 10/2000 | Fukada ......................... | 180/408 |
| 6,185,485 | B1 | * | 2/2001 | Ashrafi et al. ..................... | 701/1 |
| 6,374,172 | B1 | * | 4/2002 | Yamaguchi et al. ............ | 701/90 |
| 6,405,113 | B1 | * | 6/2002 | Yamawaki et al. ............. | 701/41 |
| 6,411,876 | B1 | * | 6/2002 | Badenoch ....................... | 701/41 |
| 6,658,333 | B2 | * | 12/2003 | Kawada et al. ................. | 701/41 |

(Continued)

FOREIGN PATENT DOCUMENTS

| | | | |
|---|---|---|---|
| JP | 2001-001923 A | * | 1/2001 |
| JP | 2002-046640 A | | 2/2002 |

(Continued)

*Primary Examiner* — John Q Nguyen
*Assistant Examiner* — Michael Whalen
(74) *Attorney, Agent, or Firm* — Carrier Blackman & Associates, P.C.; Joseph P. Carrier; William D. Blackman

(57) ABSTRACT

A vehicle body drifting suppression device including a steering torque detection unit which detects a steering torque of a vehicle, wherein a vehicle body drifting suppression is performed according to a vehicle body drifting suppression control-amount, and the vehicle body drifting suppression control-amount is adjusted according to a temporal sustention status of the steering torque.

9 Claims, 2 Drawing Sheets

(56) References Cited

U.S. PATENT DOCUMENTS

| | | | |
|---|---|---|---|
| 6,898,966 B2 * | 5/2005 | Ono et al. | 73/146 |
| 6,968,920 B2 * | 11/2005 | Barton et al. | 180/446 |
| 7,366,598 B2 * | 4/2008 | Ono et al. | 701/30.2 |
| 7,725,227 B2 * | 5/2010 | Pattok et al. | 701/41 |
| 7,737,832 B2 * | 6/2010 | Baratoff et al. | 340/435 |
| 7,753,162 B2 * | 7/2010 | Shiozawa et al. | 180/446 |
| 8,170,754 B2 * | 5/2012 | Yamazaki et al. | 701/45 |
| 8,255,119 B2 * | 8/2012 | Komori et al. | 701/38 |
| 2002/0029102 A1 * | 3/2002 | Badenoch | 701/41 |
| 2002/0120378 A1 * | 8/2002 | Kawada et al. | 701/41 |
| 2004/0055809 A1 * | 3/2004 | Wetzel et al. | 180/444 |
| 2004/0159489 A1 * | 8/2004 | Toda et al. | 180/446 |
| 2004/0186649 A1 * | 9/2004 | Ono et al. | 701/80 |
| 2004/0238265 A1 * | 12/2004 | Tsuchiya | 180/446 |
| 2005/0189163 A1 * | 9/2005 | Barton et al. | 180/446 |
| 2007/0021889 A1 * | 1/2007 | Tsuchiya | 701/41 |
| 2008/0217099 A1 * | 9/2008 | Reungwetwattana et al. | 180/446 |
| 2009/0095564 A1 * | 4/2009 | Tashiro | 180/443 |
| 2009/0095565 A1 * | 4/2009 | Tashiro | 180/446 |
| 2009/0125187 A1 * | 5/2009 | Yamamoto et al. | 701/42 |
| 2009/0271072 A1 * | 10/2009 | Yamazaki et al. | 701/41 |
| 2009/0276111 A1 * | 11/2009 | Wang et al. | 701/23 |
| 2009/0299573 A1 * | 12/2009 | Thrun et al. | 701/41 |
| 2010/0087988 A1 * | 4/2010 | Nakamura et al. | 701/41 |
| 2010/0145579 A1 * | 6/2010 | O'Brien | 701/42 |
| 2011/0029200 A1 * | 2/2011 | Shah | 701/41 |
| 2011/0046841 A1 * | 2/2011 | Yamazaki et al. | 701/29 |
| 2011/0184608 A1 * | 7/2011 | Benyo et al. | 701/41 |
| 2012/0197496 A1 * | 8/2012 | Limpibunterng et al. | 701/42 |

FOREIGN PATENT DOCUMENTS

| | | | |
|---|---|---|---|
| JP | 2006044505 A * | 2/2006 | |
| JP | 2006-231947 A | 9/2006 | |
| JP | 2007-022170 A | 2/2007 | |
| JP | 2007-062712 A | 3/2007 | |
| JP | 2007-168617 A | 7/2007 | |
| WO | WO 2009/131116 A1 | 10/2009 | |

* cited by examiner

VEHICLE BODY DRIFTING SUPPRESSION DEVICE

BACKGROUND OF THE INVENTION

1. Field of the Invention

The present invention relates to a vehicle body drifting suppression device which suppresses a drifting of a vehicle body with respect to a lateral slope of a road surface.

Priority is claimed on Japanese Patent Application No. 2008-129693, filed May 16, 2008, the content of which is incorporated herein by reference.

2. Description of Related Art

To enable safe driving while raining, some roads have lateral slopes on their surface so that rain will not accumulate on the road surface. When a vehicle is running on such a road that has a lateral slope, the vehicle skids towards a lower portion of the road surface. Hereinafter, this phenomenon will be called "vehicle body drifting".

When vehicle body drifting occurs in this way, a driver's burden of driving the vehicle increases because the driver is forced to adjust the operation of the vehicle by using a steering wheel in order to drive straight without having the vehicle skid towards the lower portion of the road surface.

Consequently, vehicle body drifting suppression devices have been developed, which suppress the drifting of the vehicle body while reducing the driver's burden of driving the vehicle. For example, an electric-powered steering device is known, which increases the control of a steering assist amount when vehicle body drifting is detected, compared to when vehicle body drifting has not occurred (for example, refer to Japanese Unexamined Patent Application, First Publication No. 2007-168617).

In such related vehicle body drifting suppression devices, a steering assist modification amount (a vehicle body drifting suppression control-amount) is defined according to a steering torque amount detected by a steering torque sensor, for the use in the vehicle body drifting restricting control.

Consequently, there was a problem in that the driver senses an unnatural driving feel, when the steering assist modification amount reacted in an exceedingly sensitive manner on the change of the steering torque.

Accordingly, the present invention provides a vehicle body drifting suppression device in which the driver does not sense unnatural driving feel.

SUMMARY OF THE INVENTION

In order to solve the above problem, one aspect of the present invention employs the following.

(1) A vehicle body drifting suppression device including a steering torque detection unit which detects a steering torque of a vehicle, wherein a vehicle body drifting suppression is performed according to a vehicle body drifting suppression control-amount, and the vehicle body drifting suppression control-amount is adjusted according to a temporal sustention status of the steering torque.

According to this vehicle body drifting suppression device, an over-sensitive operation of the drifting suppression can be avoided. Consequently, the drifting suppression can be performed appropriately when it is necessary; resulting in natural driving feels of the driver.

(2) The vehicle body drifting suppression device of above (1) may be constituted such that, when the steering torque is maintained at a value equal to or larger than a predetermined value for longer than a predetermined amount of time, the vehicle body drifting suppression control-amount is increased.

In this case, when the steering torque is maintained at a high level, the vehicle body drifting suppression control-amount can be increased, and thereby the driver's burden can be relieved. Moreover, the vehicle body drifting suppression control-amount can be gradually increased, in view of the steering torque, instead of abruptly applying a drifting suppression control.

Consequently, an unnatural feel on the driver caused by a sharp change of the operation can be avoided.

(3) The vehicle body drifting suppression device of above (1) may be constituted such that, when the steering torque is maintained at a value equal to or smaller than a predetermined value for longer than a predetermined amount of time, the vehicle body drifting suppression control-amount is decreased.

In this case, when the steering torque is maintained at a low level, the vehicle body drifting suppression control-amount can be decreased, and thereby the vehicle body drifting suppression can be operated gradually toward a termination. Accordingly, an abrupt termination of the drifting suppression can be avoided.

(4) The vehicle body drifting suppression device of above (1) may be constituted such that, the vehicle body drifting suppression includes a steering assisting control of an electronic power steering device, the steering assisting control uses a target steering assisting torque as a base control amount, and the vehicle body drifting suppression control-amount is calculated by adjusting the base control amount according to the steering torque.

In this case, the steering assisting control for drifting suppression can be performed according to the changes in the steering torque. Consequently, abrupt, unintended changes in steering assisting control can be avoided.

(5) The vehicle body drifting suppression device of above (1) may be constituted such that, the vehicle body drifting suppression includes a rear-steering angle control of a four-wheel steering device, the steering assisting control uses a target rear-steering angle as a base control amount, and the vehicle body drifting suppression control-amount is calculated by adjusting the base control amount according to the steering torque.

In this case, the rear-steering angle control for drifting suppression can be performed according to the changes in the steering torque. Consequently, abrupt, unintended changes in rear-steering angle control can be avoided.

(6) The vehicle body drifting suppression device of above (1) may be constituted such that, the vehicle body drifting suppression includes a driving torque control of a four-wheel driving device, the steering assisting control uses a target left/right driving torque as a base control amount, and the vehicle body drifting suppression control-amount is calculated by adjusting the base control amount according to the steering torque.

In this case, the driving torque control of a four-wheel driving device for drifting suppression can be performed according to the changes in the steering torque. Consequently, abrupt, unintended changes in rear-steering angle control can be avoided.

(7) The vehicle body drifting suppression device of above (1) may be constituted such that, the vehicle body drifting suppression device further includes a vehicle body drifting assertion part, a yaw rate sensor, a steering angle sensor, and a steering torque sensor, wherein the vehicle body drifting assertion part asserts whether a vehicle body is in a vehicle body drifting suppression steering status, based on output-signals from the yaw rate sensor, the steering angle sensor, and the steering torque sensor, and the vehicle body drifting suppression control-amount is adjusted the vehicle body drifting suppression is performed when the vehicle body is in the vehicle body drifting suppression steering status.

In this case, vehicle body drifting suppression can be performed only in a situation where such suppression is necessary, thereby preventing possible unintended interferences by the vehicle body drifting suppression to the driver's vehicle control.

DETAILED DESCRIPTION OF THE INVENTION

Hereunder, an embodiment of a vehicle body drifting suppression device according to the present invention is described with reference to FIGS. 1 and 2.

Figure 1:
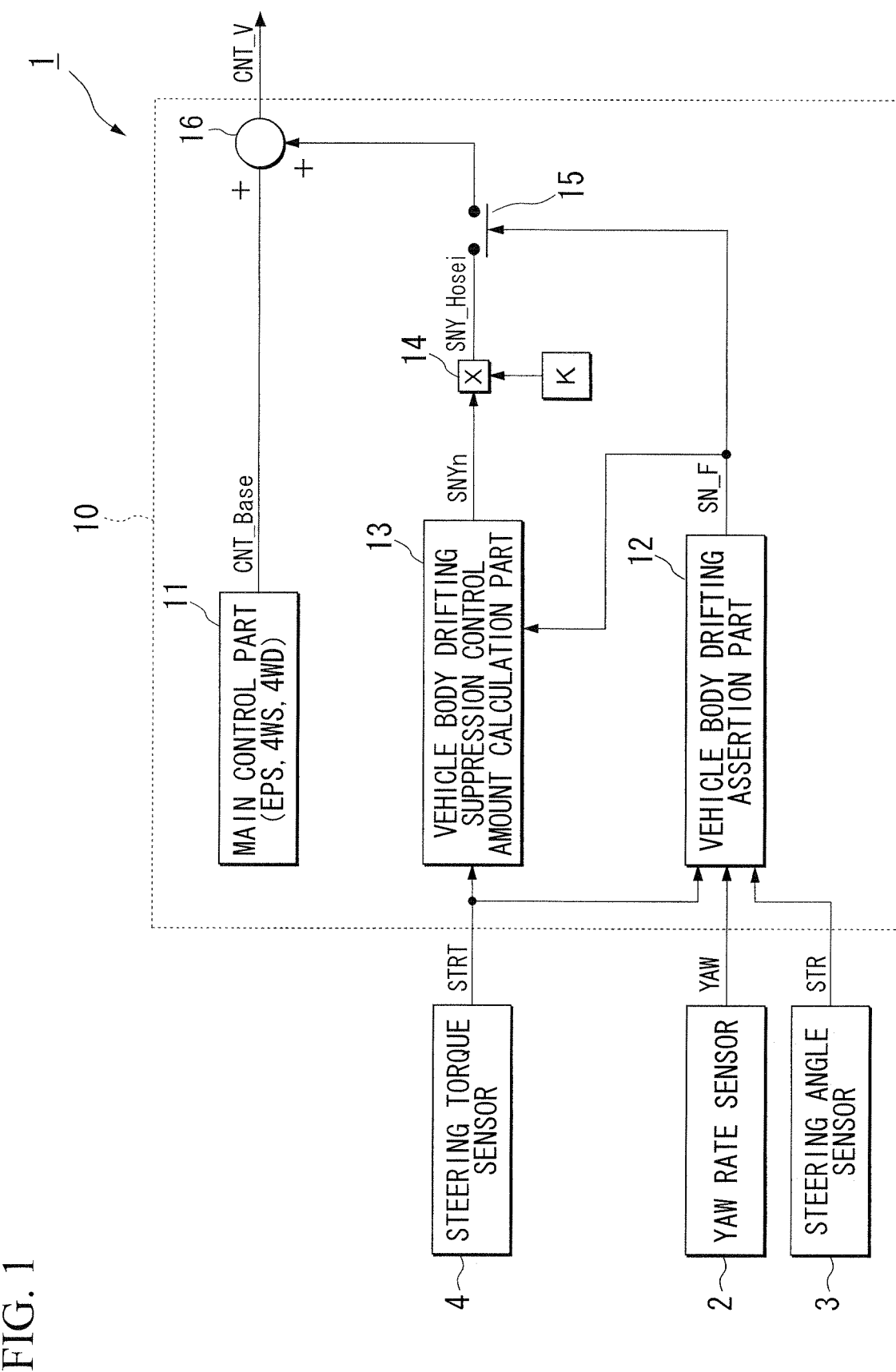
FIG. 1 is a block diagram in an embodiment of a vehicle body drifting suppression device according to the present invention.
Figure 2:
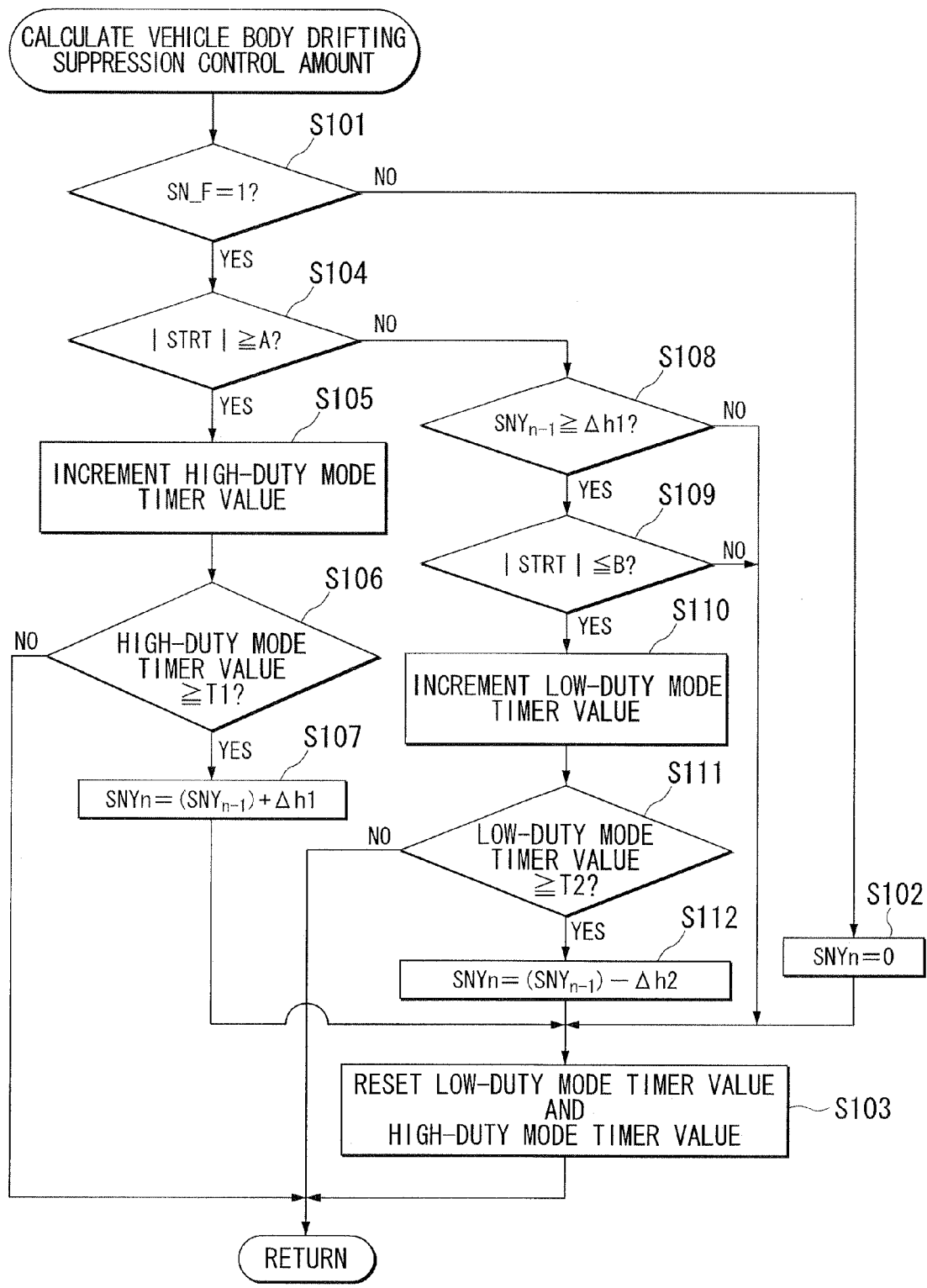
FIG. 2 is a flowchart showing a vehicle body drifting suppression control-amount calculation process according to the vehicle body drifting suppression device in the embodiment.

As shown in the block diagram of FIG. 1, a vehicle body drifting suppression device 1 includes a yaw rate sensor 2 which detects a yaw rate of a vehicle; a steering angle sensor 3 which detects a steering angle of the vehicle steering shaft; a steering torque sensor 4 which detects a steering torque applied to the steering shaft by the driver; and an electronic control unit (ECU) 10.

Each of the yaw rate sensor 2, the steering angle sensor 3, and the steering torque sensor 4 outputs an output-signal, i.e., YAW, STR, or STRT, according to their respective detection value, to the ECU 10.

The ECU 10 includes a main control part 11, a vehicle body drifting assertion part 12, a vehicle body drifting suppression control-amount calculation part 13, and other parts.

The main control part 11 is a control unit which operates whether or not the vehicle body drifting suppression control is functioning. The control targets of the main control part 11 are anything that changes the yaw angle of the vehicle. During the operation of the vehicle body drifting suppression control, the vehicle body drifting is suppressed by adjusting a base control amount (CNT_Base), which is output from the main control part 11, according to a vehicle body drifting suppression control-amount (SNY_Hosei).

For example, the main control part 11 may be constituted including a steering assisting control function of an electronic power steering device (hereinafter, referred to as EPS). In this case, the base control amount (CNT_Base) is a target steering assisting torque. Alternatively, the main control part 11 may be constituted including a rear-steering angle control function of a four-wheel steering device (hereinafter, referred to as 4WS). In this case, the base control amount (CNT_Base) is a target rear-steering angle. Further alternatively, the main control part 11 may be constituted including a driving torque control function of a four-wheel driving device (hereinafter, referred to as 4WD). In this case, the base control amount (CNT_Base) is a target left/right driving torque.

The vehicle body drifting assertion part 12 asserts whether the vehicle is in a steering status of moving forward while resisting a vehicle body drifting, based on output-signals from the yaw rate sensor 2, the steering angle sensor 3, and the steering torque sensor 4 (hereinafter, this status is referred to as vehicle body drifting suppression steering status). This assertion process is described in detail below.

The vehicle body drifting assertion part 12 asserts that the vehicle is in a vehicle body drifting suppression steering status, when: the absolute value of the yaw rate YAW detected by the yaw rate sensor 2 is equal to or smaller than a predetermined value Y1; the absolute value of the steering angle STR detected by the steering angle sensor 3 is equal to or greater than a predetermined value S1; and the absolute value of the steering torque STRT detected by the steering torque sensor 4 is equal to or greater than a predetermined value T1. In this case, the vehicle body drifting assertion part 12 sets a vehicle body drifting suppression flag SN_F to '1'. On the contrary, when, either the absolute value of the yaw rate YAW is greater than the predetermined value Y1; the absolute value of the steering angle STR is smaller than the predetermined value S1; or the absolute value of the steering torque STRT is smaller than the predetermined value T1, the vehicle body drifting assertion part 12 asserts that the vehicle is not in a vehicle body drifting suppression steering status. In this case, the vehicle body drifting suppression flag SN_F is set to be '0'.

Thereafter, the vehicle body drifting assertion part 12 outputs the vehicle body drifting suppression flag SN_F to the vehicle body drifting suppression control-amount calculation part 13 and a vehicle body drifting suppression control ON/OFF switch 15. The vehicle body drifting suppression control-amount calculation part 13 calculates a vehicle body drifting suppression control-amount SNYn, based on an output-signal STRT of the steering torque sensor 4 and the signal of the vehicle body drifting suppression flag SN_F.

This vehicle body drifting suppression control-amount calculation process performed by the vehicle body drifting suppression control-amount calculation part 13 is described hereinafter, referring to the flow chart of FIG. 2. The vehicle body drifting suppression control-amount calculation routine shown in the flow chart of FIG. 2 is performed repeatedly by the ECU 10.

First, in the step S101, whether the vehicle body drifting suppression flag SN_F is '1' or not is asserted.

When the assertion result in the step S101 is NO, the vehicle is not in a vehicle body drifting suppression steering status. In this case, the process proceeds to the step S102, and the vehicle body drifting suppression control-amount SNYn is set to a default value of 0 (SNYn=0). Further, the process proceeds to the step S103, and resets a high-duty mode timer and a low-duty mode timer. The process returns thereafter.

When the assertion result in the step S101 is YES (vehicle body drifting suppression steering status), the process proceeds to step S104 and asserts whether the absolute value of the steering torque STRT detected by the steering torque sensor 4 is equal to or greater than the predetermined value A.

When the assertion result in the step S104 is YES (|START|≥A), the process proceeds to step S105 and increments the high-duty mode timer by one.

Next the process proceeds to step S106 and asserts whether the high-duty mode timer is equal to or greater than the predetermined value t1.

When the assertion result was NO (the high-duty mode timer<t1), then the process just returns.

When the assertion result in the step S106 was YES (the high-duty mode timer≥t1), the process proceeds to step S107. In step S107, the process adds a predetermined constant value $\Delta h1$ to the previous value $SNYn_{-1}$ of the vehicle body drifting suppression control-amount, to calculate the present value SNYn of the vehicle body drifting suppression control-amount ($SNYn=SNYn_{-1}+\Delta h1$). The process further proceeds to step S103, reset the high-duty mode timer, and returns.

In other words, when the vehicle is in the vehicle body drifting suppression steering status, if a high-duty status, in which the absolute value of the steering torque STRT is equal to or greater than the predetermined value A, was maintained for longer than the predetermined amount of time t1, then the predetermined constant value $\Delta h1$ is added to the vehicle body drifting suppression control-amount. After $\Delta h1$ is added to the vehicle body drifting suppression control-amount, the high-duty mode timer is reset. Even when the vehicle is in the vehicle body drifting suppression steering status, if the high-duty status was maintained only for a period shorter than the predetermined amount of time t1, the vehicle body drifting suppression control-amount was maintained at the present value.

On the other hand, when the assertion result in step S104 was NO (|START|<A), then the process proceeds to step S108, and asserts whether the previous value $SNYn_{-1}$ of the vehicle body drifting suppression control-amount is equal to or greater then $\Delta h1$.

If the assertion result in step S108 was NO ($SNYn_{-1}<\Delta h1$), then the process proceeds to step S103, in which the high-duty mode timer and the low-duty mode timer are reset, and the process returns. Accordingly, in this case, the vehicle body drifting suppression control-amount is maintained at its original value '0'.

If the assertion result in step S108 is YES ($SNYn_{-1}>\Delta h1$), then the process proceeds to step S109, in which the process asserts whether the absolute value of the steering torque STRT, which is detected by the torque sensor 4, is equal to or smaller than a predetermined value B. The predetermined value B is smaller than the predetermined value A (A>B).

If the assertion result in step S109 was YES (|STRT|≤B) the process proceeds to step S110, in which the low-duty mode timer is incremented by one.

Next, the process proceeds to step S111, in which the process asserts whether the low-duty mode timer value is equal to or larger than the predetermined value t2. The predetermined value t2 may or may not be equal to the predetermined value t1.

If the assertion result in step S111 was NO (low-duty mode timer value<t2), the process just returns.

If the assertion result in step S111 was YES (low-duty mode timer value≥t2), the process proceeds to step S112, in which a predetermined constant value $\Delta h2$ is subtracted from the previous value $SNYn_{-1}$ of the vehicle body drifting suppression control-amount, to calculate the present value SNYn of the vehicle body drifting suppression control-amount ($SNYn=SNYn_{-1}-\Delta h2$). The process then further proceeds to step S103, wherein the process resets the low-duty mode timer, and returns. In this procedure, $\Delta h2$ may or may not be equal to $\Delta h1$.

In other words, when the vehicle is in the vehicle body drifting suppression steering status, if a low-duty status, in which the absolute value of the steering torque STRT is equal to or smaller than the predetermined value B, was maintained for longer than the predetermined amount of time t2, then the predetermined constant value $\Delta h1$ is subtracted from the vehicle body drifting suppression control-amount. After $\Delta h1$ is subtracted from the vehicle body drifting suppression control-amount, the low-duty mode timer is reset. Even when the vehicle is in the vehicle body drifting suppression steering status, if the low-duty status was maintained only for a period shorter than the predetermined amount of time t2, the vehicle body drifting suppression control-amount was maintained at the present value.

If the assertion result in step S109 was NO (|STRT|>B), then the process asserts that the vehicle is in a medium-duty status, in which the absolute value of the steering torque STRT is at a value larger than the predetermined value B and smaller than the predetermined value A. In this case, the process proceeds to step S103, resets the low-duty mode timer and the high-duty mode timer, and returns. In other words, when the steering torque STRT is in the medium-duty status, the vehicle body drifting suppression control-amount is maintained at the present value, without increasing or decreasing the value.

The present value SNYn of the drifting suppression control-amount, which is calculated as described above by the vehicle body drifting suppression control-amount calculation part 13, is input to the multiplier 14. In the multiplier 14, the input value is multiplied by a factor K, to calculate a modified value SNY_Hosei (SNY_Hosei=SNYn×K). In this process, the factor K is a modification factor which is determined according to the control target of the main control part 11. When the main control part 11 is a steering assisting control in an EPS, a steering torque modification factor K1 is used as the factor K. When the main control part 11 is a rear-steering angle control of a 4WS, a steering angle modification factor K2 is used. When the main control part 11 is a driving torque of a 4WD, a driving torque modification factor K3 is used.

If the vehicle body drifting suppression flag SN_F, which is input from the vehicle body drifting assertion part 12, is 1, then the vehicle body drifting suppression control ON/OFF switch 15 is set to be 'ON'. When the vehicle body drifting suppression flag SN_F is 0, the vehicle body drifting suppression control ON/OFF switch 15 is set to be 'OFF'.

If the vehicle body drifting suppression control ON/OFF switch 15 is ON, then the base control amount CNT_Base of the main control part 11, is input to the adder 16. The adder 16 adds the input value with the modification value SNY_Hosei (CNT_V=CNT_Base+SNY_Hosei), to calculate the control amount CNT_V of the main control part 11. The calculated control amount CNT_V is output to a driving circuit (not shown).

Furthermore, when the vehicle body drifting suppression control ON/OFF switch 15 is OFF, not the modification value SNY_Hosei, but only the base control amount CNT_Base of the control part 11 is input to the adder 16. Accordingly, the base control amount CNT_Base is output as the control amount CNT_V of the main control part 11 (CNT_V=CNT_Base).

As explained above, in the vehicle body drifting suppression device 1 of the present embodiment, the vehicle body drifting suppression control-amount can be modified according to the steering torque amount and the sustention time of the steering torque. Consequently, assistance for an optimal vehicle body drifting suppression in accordance with the driver's burden can be obtained.

Particularly, when the steering torque is maintained at a high level, the vehicle body drifting suppression control-amount can be appropriately increased, resulting in an relief of the driver's burden.

When increasing/decreasing the vehicle body drifting suppression control-amount, the process refers to the factors such as sustention time of a high-level steering torque or a low-level steering torque. Therefore, by appropriately adjusting the predetermined value t1 and t2 for the high-duty mode timer and low-duty mode timer, the vehicle body drifting suppression control-amount can be either quickly or gradually changed.

Accordingly, when assistance operation for the vehicle body drifting suppression is initiated, this change of the operation status does not cause an unnatural driving feel on the driver. In addition, when the vehicle body drifting suppression control-amount is either increased or decreased, this change of the operation status does not cause an unnatural driving feel on the driver.

Furthermore, when the steering torque is maintained at a low level, the vehicle body drifting suppression control-amount can be decreased, to gradually terminate the vehicle body drifting suppression.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body drifting suppression device configured to perform a vehicle body drifting suppression control that suppresses a vehicle body drifting toward a lower portion of a road surface on which the vehicle body is traveling, the lower portion being lower with respect to a horizontal direction of the road surface due to an inclination of the road surface crosswise to a direction of travel of the vehicle body comprising:
    a steering torque detection unit which detects a steering torque of a vehicle;
    a yaw rate detection unit which detects a yaw rate of the vehicle,
    a steering angle detection unit which detects a steering angle,
    a vehicle body drifting assertion part which asserts that the vehicle is in a drifting status when:
        an absolute value of the yaw rate is equal to or smaller than a predetermined yaw rate value;
        an absolute value of the steering angle is equal to or greater than a predetermined steering angle value; and
        an absolute value of the steering torque is equal to or greater than a predetermined steering torque value,
        wherein when the vehicle body drifting assertion part asserts that the vehicle is in a drifting status:
        a vehicle body drifting suppression is performed according to a vehicle body drifting suppression control-amount, and
        the vehicle body drifting suppression control-amount is adjusted according to a temporal sustention status of the steering torque, and
        when the vehicle is not in the drifting status, regardless of a previous value of the vehicle body drifting suppression control-amount, the vehicle body drifting suppression control-amount is set to 0,
    wherein when the steering torque is maintained at a value equal to or larger than a first predetermined value for longer than a first predetermined amount of time, the vehicle body drifting suppression control-amount is increased over the previous value, and when the previous value of the vehicle body drifting suppression control-amount is set equal to or greater than a predetermined amount larger than 0 and the steering torque is maintained at an absolute value equal to or smaller than a second predetermined value for longer than a second predetermined amount of time, the vehicle body drifting suppression control-amount is decreased smaller than the previous value,
    wherein the second predetermined value is smaller than the first predetermined value.

2. The vehicle body drifting suppression device according to claim 1, wherein
    the vehicle body drifting suppression includes a steering assisting control of an electronic power steering device,
    the steering assisting control uses a target steering assisting torque as a base control amount, and
    the vehicle body drifting suppression control-amount is calculated by adjusting the base control amount according to the steering torque.

3. The vehicle body drifting suppression device according to claim 1, wherein
    the vehicle body drifting suppression includes a rear-steering angle control of a four-wheel steering device,
    the steering assisting control uses a target rear-steering angle as a base control amount, and
    the vehicle body drifting suppression control-amount is calculated by adjusting the base control amount according to the steering torque.

4. The vehicle body drifting suppression device according to claim 1, wherein
    the vehicle body drifting suppression includes a driving torque control of a four-wheel driving device, the driving torque control being configured to regulate a wheel driving torque,
    the steering assisting control uses a target left/right driving torque as a base control amount, and
    the vehicle body drifting suppression control-amount is calculated by adjusting the base control amount according to the steering torque.

5. The vehicle body drifting suppression device according to claim 1, further comprising a vehicle body drifting assertion part, a yaw rate sensor comprised in the yaw rate detection unit, a steering angle sensor, and a steering torque sensor comprised in the steering angle detection unit, wherein
    the vehicle body drifting assertion part asserts whether a vehicle body is in a vehicle body drifting suppression steering status, based on output-signals from the yaw rate sensor, the steering angle sensor, and the steering torque sensor, and
    the vehicle body drifting suppression is performed when the vehicle body is in the vehicle body drifting suppression steering status.

6. The vehicle body drifting suppression device according to claim 1, further comprising:
    adjusting at least one of the first predetermined amount of time and the second predetermined amount of time in order to control the rate at which the vehicle suppression control amount is changed.

7. The vehicle body drifting suppression device according to claim 1, wherein the first predetermined amount of time is equal to the second predetermined amount of time.

8. The vehicle body drifting suppression device according to claim 1, wherein the first predetermined amount of time is not equal to the second predetermined amount of time.

9. The vehicle body drifting suppression device according to claim 1, further comprising a first timer measuring time relative to the first predetermined amount of time and a second timer measuring time relative to the second predetermined amount of time,
    wherein a first timer value for the first timer and a second timer value for the second timer are reset when one of:

the vehicle is determined to not be in a drifting status, the vehicle body drifting suppressing control amount is increased over the previous set value, and the vehicle body drifting suppressing control amount is decreased over the previous set value.

\* \* \* \* \*